United States Patent [19]

Brookes et al.

[11] 4,049,283
[45] Sept. 20, 1977

[54] LADDER CADDY

[76] Inventors: Malcolm J. Brookes, 30 E. 68th St., New York, N.Y. 10021; James A. Sheridan, Box 295-A, Rte. 1, Englishtown, N.J. 07726; Douglas M. Spranger, 23 Fiske Place, Brooklyn, N.Y. 11215

[21] Appl. No.: 681,602

[22] Filed: Apr. 29, 1976

Related U.S. Application Data

[62] Division of Ser. No. 547,801, Feb. 7, 1975, Pat. No. 3,991,852.

[51] Int. Cl.² ............................................. B62B 1/26
[52] U.S. Cl. .............................. 280/47.13 R; 182/127
[58] Field of Search ................. 280/47.13 R, 47.13 B, 280/47.15, 13, 79.1; 182/127, 169; 248/316 D

[56] References Cited

U.S. PATENT DOCUMENTS

| 750,402 | 1/1904 | Sechler | 182/127 X |
| 1,589,351 | 6/1926 | Blaw | 182/127 |
| 2,426,244 | 8/1947 | Sitton | 280/47.13 R X |
| 2,818,265 | 12/1957 | Calderwood | 280/13 |
| 3,154,281 | 10/1964 | Frank | 248/316 D |

Primary Examiner—Joseph F. Peters, Jr.
Assistant Examiner—R. Schrecengost

[57] ABSTRACT

In order to transport a heavy ladder to a work site, a caddy is provided in the form of a pair of transverse pieces having resilient clips installed thereon adapted to engage and clamp onto any rung of the ladder. The pieces are attached at spaced positions to the bridge of a two-wheeled carriage so that the pieces are adapted to straddle and engage a pair of adjacent rungs on the ladder in wheel-barrow position.

3 Claims, 10 Drawing Figures

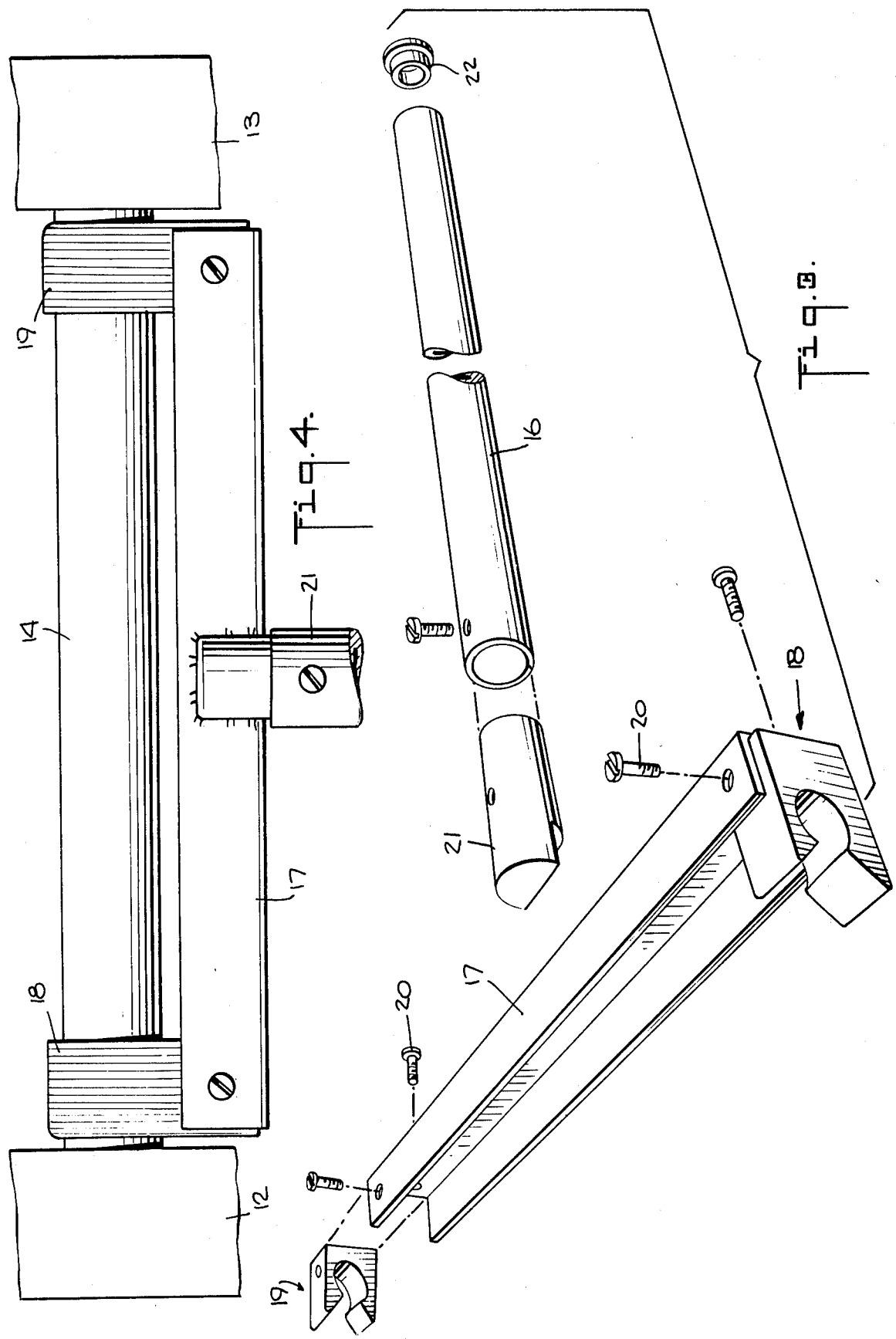

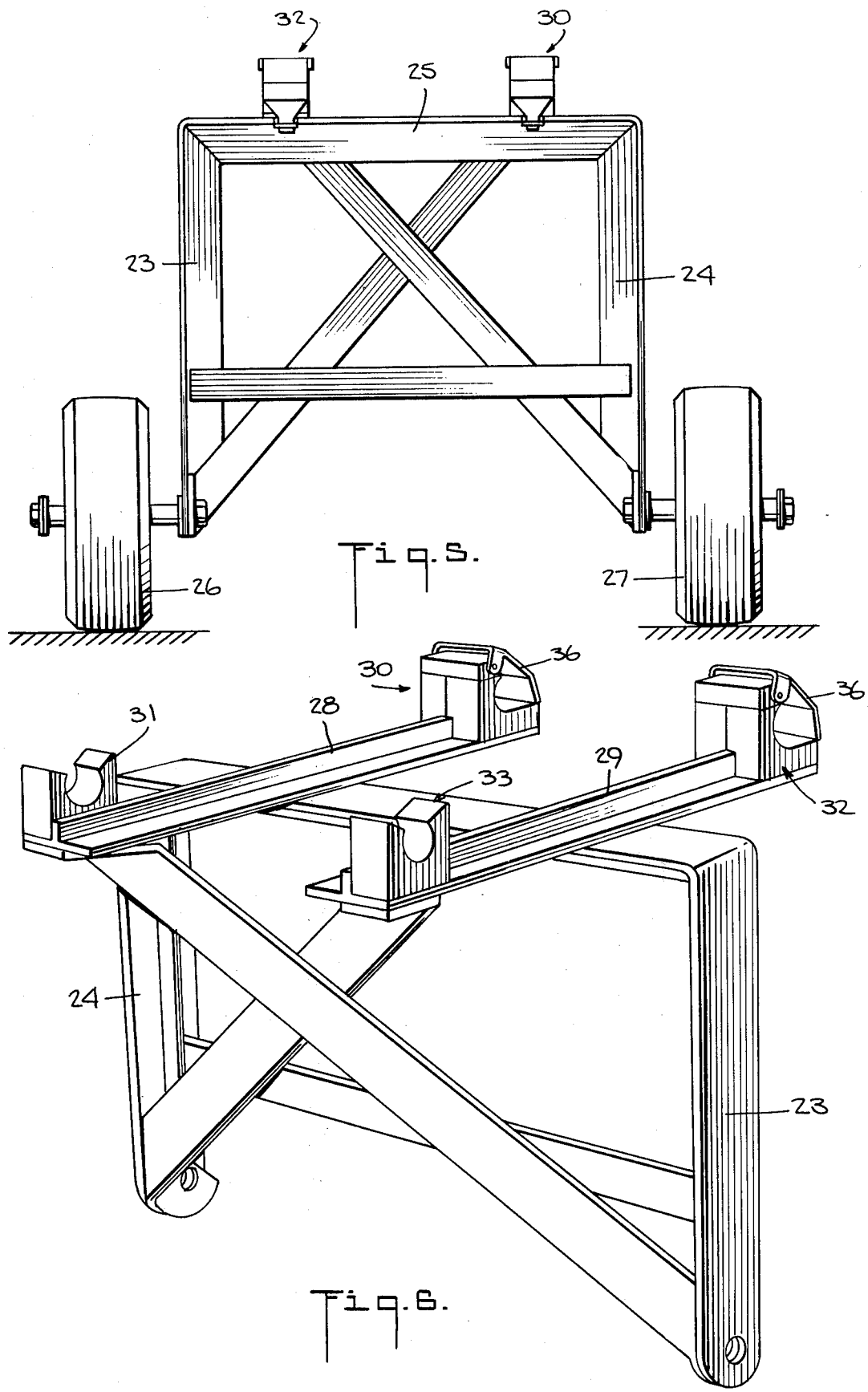

4,049,283

LADDER CADDY

RELATED APPLICATION

This application is a division of the copending application Ser. No. 547,801, filed Feb. 7, 1975, now Pat. No. 3,991,852 entitled "Ladder Aids."

BACKGROUND OF INVENTION

This invention relates generally to the handling of ladders, and especially to a caddy facilitating the transport of heavy ladders.

A ladder, which is a structure for climbing up and down, consists of two sidepieces or rails joined at intervals by crosspieces or rungs on which one may step. In order to reach heights in excess of fifteen feet, use is often made of multi-section, extendable ladders.

Extendable ladders are relatively heavy and cumbersome and they are difficult to handle even in the collapsed state in which the sections overlie each other. The difficulties experienced in carrying and raising extension ladders is severely compounded in windy, inclement weather. Attempts have been made to reduce these difficulties by fabricating them from lightweight materials, such as aluminum. There are, however, many instances where the use of electrically-conductive, light-weight materials can pose severe safety hazards, as, for example, in the proximity of overhead electrical feeder cables.

On the other hand, electrically non-conductive, high structural strength ladders, such as those constructed from plastic reinforced fiber glass, have a weight comparable to wood. While such ladders are electrically safe and obviate problems of structural degradation due to weather conditions, they fail because of their weight and size to solve the handling problem. If, therefore, one needs to bring a multisection ladder to a work site, whether the ladder is of lightweight metal, wood or fiber glass, it can take two men to perform this task and then to lift the ladder from the ground to a properly raised position against a wall.

Because of the high cost of professional labor and household assistance, there is concurrently a strong do-it-yourself trend in the United States. Thus many jobs such as house painting and roof repair, which call for ladders, are performed by the homeowner and in some instances by women. The manipulation of ladders by do-it-yourselfers represents a serious problem and may be hazardous, particularly if only a single person is available to carry out this task, as is generally the case.

While, in the past, women had not been expected to make use of ladders, the movement toward equality in all fields has reached a point where women are now employed in manual jobs heretofore reserved to men and requiring the use of ladders. This is particularly true in the public utilities fields of telephone and electricity supply where there is presently heavy emphasis by the federal government on the equal employment of women in outside crafts jobs, such as linesmen.

Thus, should an individual of modest strength find it necessary to transport a multi-section ladder, say, from a garage at the rear of a house to a work site at the front of the house, the individual may strain himself in carrying out this task.

SUMMARY OF INVENTION

In view of the foregoing, it is the main object of this invention to provide devices to aid in the transport of ladders so that a person of modest strength is capable of safely performing this task without undue exertion.

More particularly, it is an object of the invention to provide a caddy which is readily attachable to the rungs of a ladder somewhere adjacent to the point of balance, whereby the ladder may then be transported by wheeling it to a work site.

Still another object of the invention is to provide a low-cost ladder caddy which is reliable and efficient in operation and which makes it possible for women and others normally incapable of handling heavy ladders to do so without difficulty or hazard.

Briefly stated, these objects are attained in a caddy for transporting a heavy ladder, the caddy comprising a pair of transverse pieces having resilient clips thereon adapted to engage and clamp onto any rod-like rung of the ladder to be raised. These pieces are mounted at spaced positions on the bridge of a two-wheel carriage so that the pieces are adapted to straddle and engage a pair of adjacent rungs in the ladder, the carriage making it possible to handle the ladder in wheelbarrow or two-wheeled cart style. Thus in the case of a heavy ladder, one may use the caddy to bring the ladder to a work site and then apply a lifter to the ladder to raise it into a work position.

OUTLINE OF DRAWING

For a better understanding of the invention as well as other objects and further features thereof, reference is made to the following detailed description to be read in conjunction with the accompanying drawing, wherein:

FIG. 3 is an exploded view of the lifter;

FIG. 4 is an elevational view of the lifter coupled to the ladder;

FIG. 5 is an elevational view of a ladder caddy in accordance with the invention;

FIG. 6 is a perspective view of the caddy;

DESCRIPTION OF INVENTION

Figure 2:
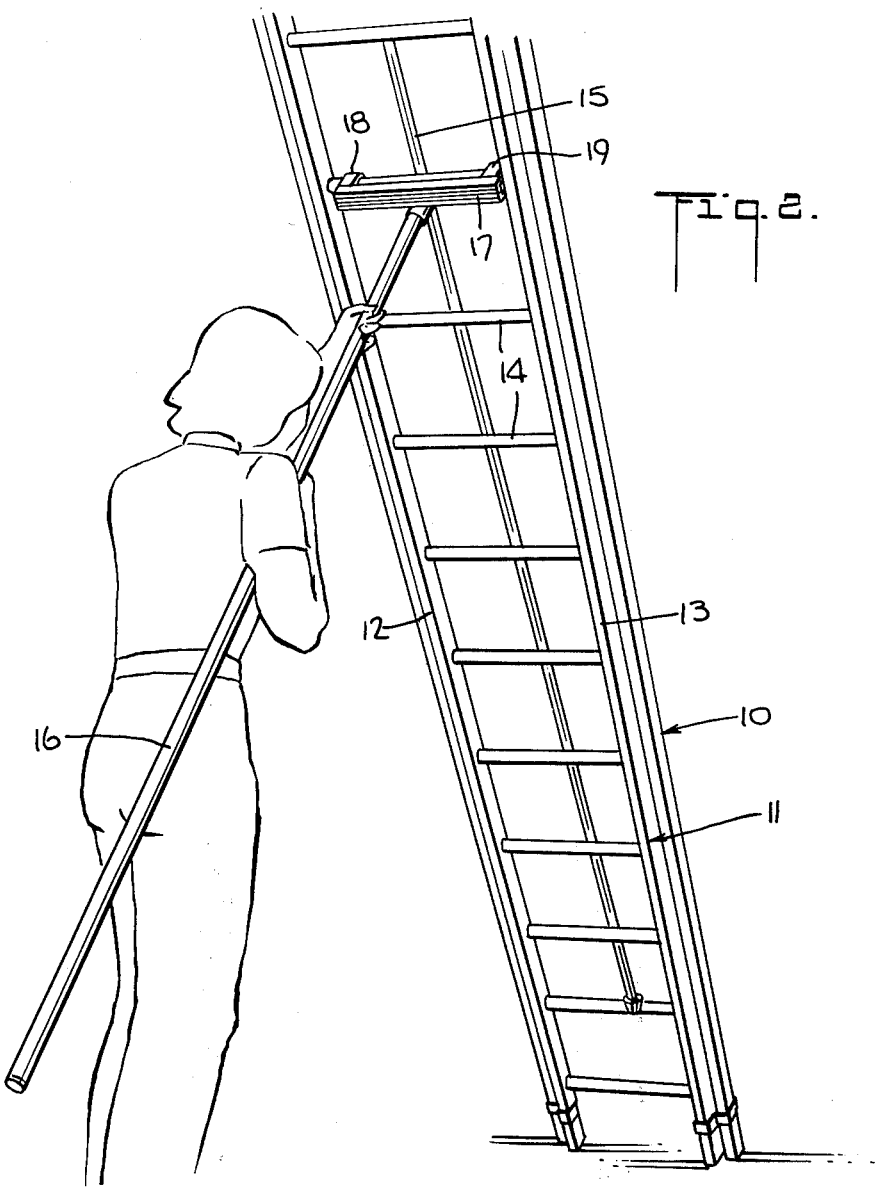
FIG. 2 is a perspective view of the lifter attached to the ladder, with the ladder being raised to a work position.
Figure 1:
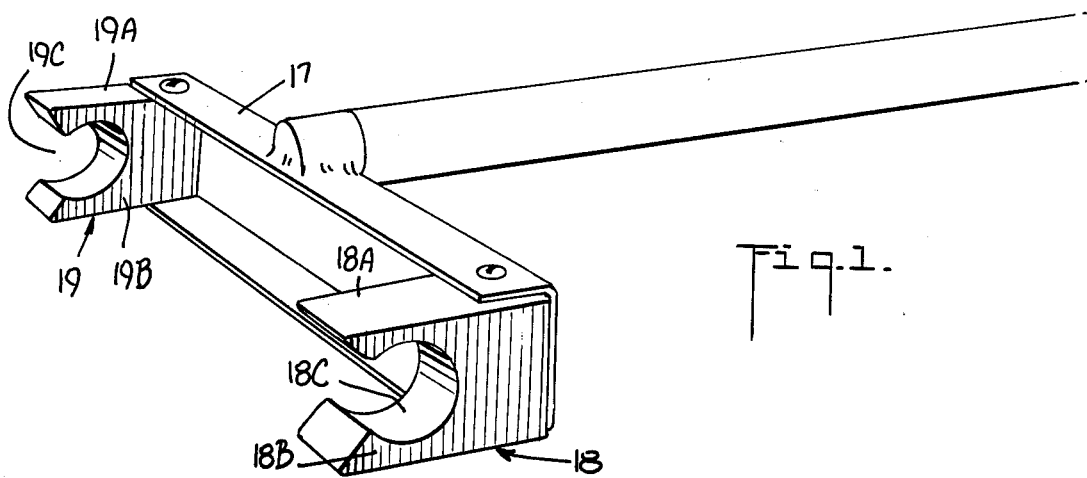
FIG. 1 is a perspective view of a ladder lifter which includes clips of the type incorporated in a caddy in accordance with the invention.

Referring now to FIGS. 1 to 4, there is shown a ladder lifter which includes clips of the type incorporated in a caddy in accordance with the invention. The lifter is illustrated as applied to an extensible ladder formed by inner and outer sections 10 and 11. Since the lifter is shown in FIG. 2 in engagement with a rung on the extension section 11 of the ladder, we shall describe this section in greater detail.

Ladder section 11 is composed of sidepieces or rails 12 and 13 and a series of spaced crosspieces or rungs 14 having a rod-like formation. In using such a sectioned ladder, it must first be raised while in the collapsed state to a vertical position in which the extension section faces the raiser. Thereafter, by means of a block and tackle 15, the outer section 11 is extended above inner section 10 to a desired height.

The ladder is constituted by a long pole 16, one end of which is attached to the midpoint of one side of a transverse piece 17 having a channel formation. A pair of clips 18 and 19 are installed in this piece at opposite ends thereof. Clips 18 and 19 project fractionally beyond the end of transverse piece 17 to avoid contact between the transverse piece and the ladder sidepieces, thereby avoiding damage to the sidepieces. The leading edges of the clips are rounded to avoid injury which might possibly occur to the sidepieces of a wooden ladder. The length of transverse piece 17 is almost equal to the space between rails 12 and 13 of the ladder section so that it fits neatly therebetween.

Clips 18 and 19, which are held in position within the channel of transverse piece 17 by suitable screws 20, are formed of a suitable resilient plastic material in block form. The use of plastic avoids damage to the ladder rungs if the rungs are made of wood. Block 18 is cut to define a pair of spring jaws 18A and 18B and a circular cavity 18C dimensioned to accommodate a rung of the ladder. Block 19 is likewise cut to define spring jaws 19A and 19B and cavity 19C. The transverse piece 17 is welded at its midpoint on one side to a metal plug 21 which is socketed within the top end of pole 16. For the sake of weight reduction, the pole may be in the form of a hollow pipe, the other end of the pipe being closed by a cap 22.

Thus to couple the lifter to the ladder, clips 18 and 19 are applied above the midpoint of the ladder to a relatively high rung thereof to force apart the spring jaws and cause the rung to be received and held within the caviities of the clips. The lifter, because if affords improved good mechanical advantage, makes it possible for the user, as shown in FIG. 2, to raise or lower the ladder without difficulty and without undue exertion. The lifter may be withdrawn from the rung simply by pulling off each clip at an angle to cause the jaws to release the rung. For very tall ladders, the pole may be provided with an extension section.

Figure 7:
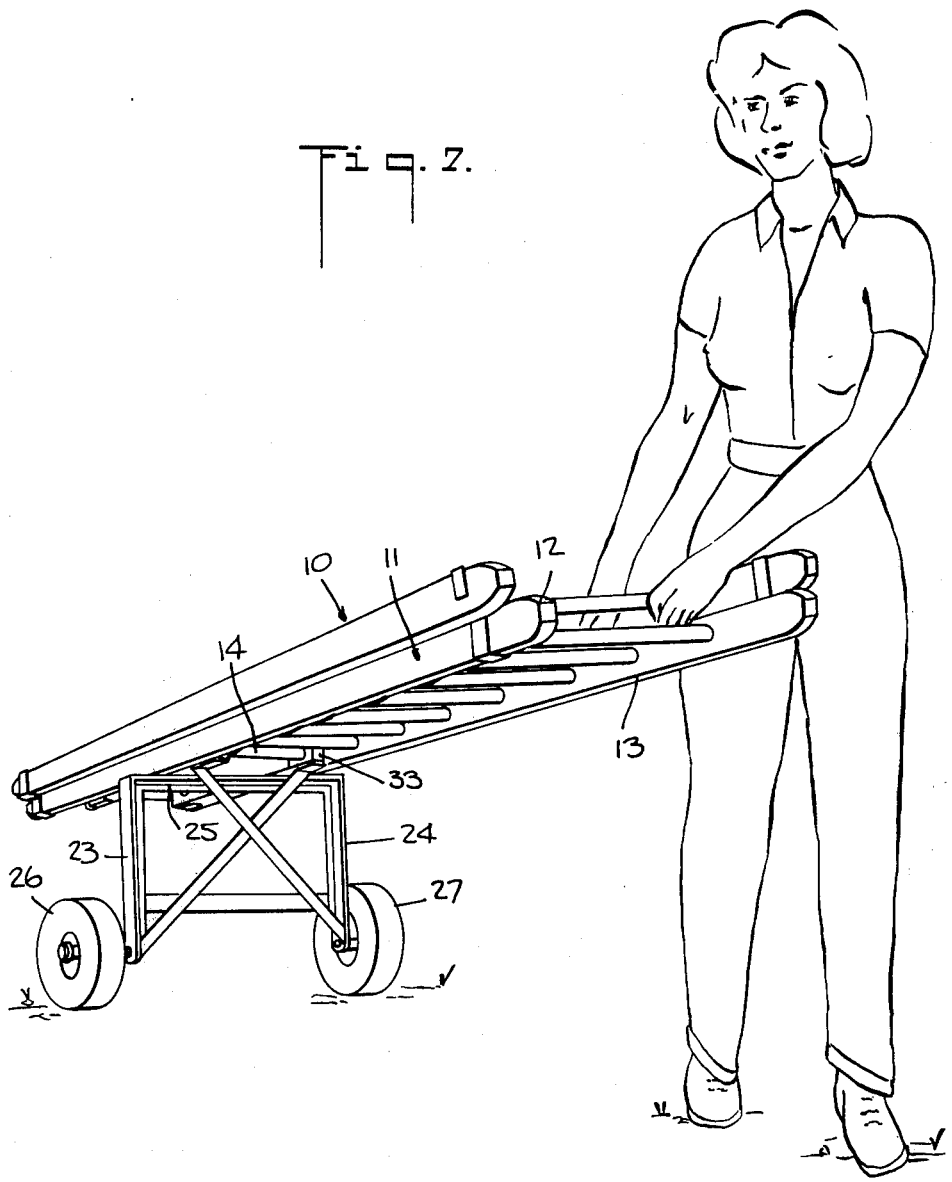
FIG. 7 shows the caddy attached to the ladder to facilitate the transport thereof.

Referring now to FIGS. 5, 6 and 7, there is shown a caddy in accordance with the invention, the caddy being constituted by a two-wheel carriage formed by a pair of vertical legs 23 and 24 whose tops are joined together by a bridge members 25. Rotatably mounted on the lower end of the legs are wheels 26 and 27. Cross braces are provided to strengthen the carriage structure.

Figure 8:
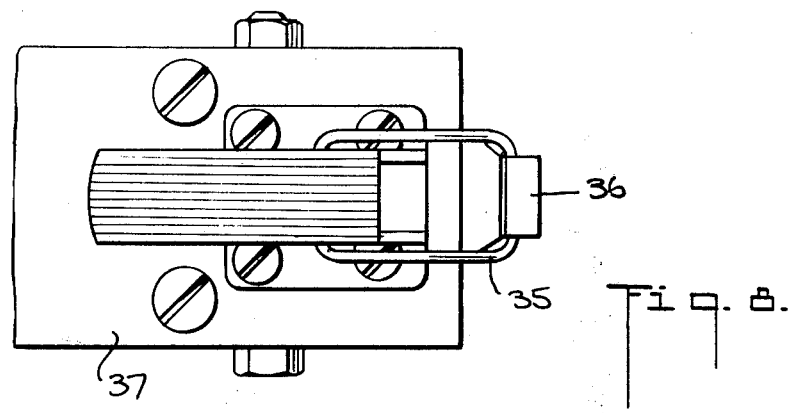
FIG. 8 is a plan view of a latched clip in accordance with the invention.
Figure 9:
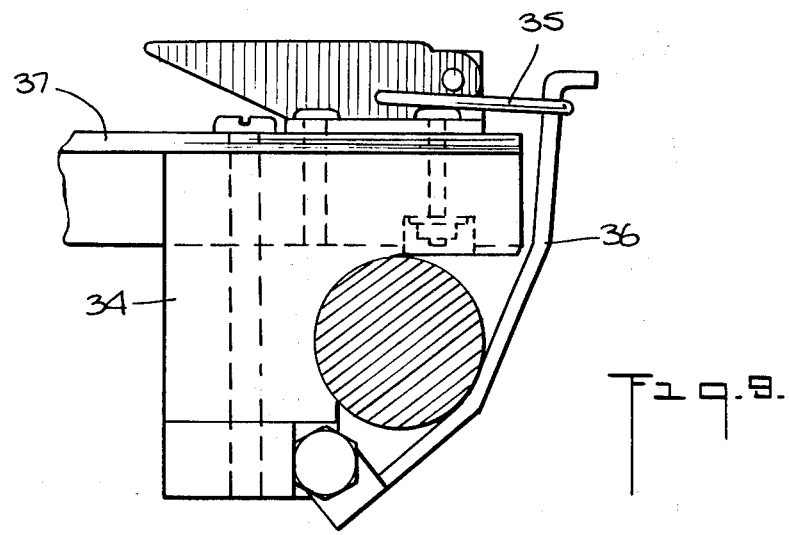
FIG. 9 is a section taken through the latched clip.
Figure 10:
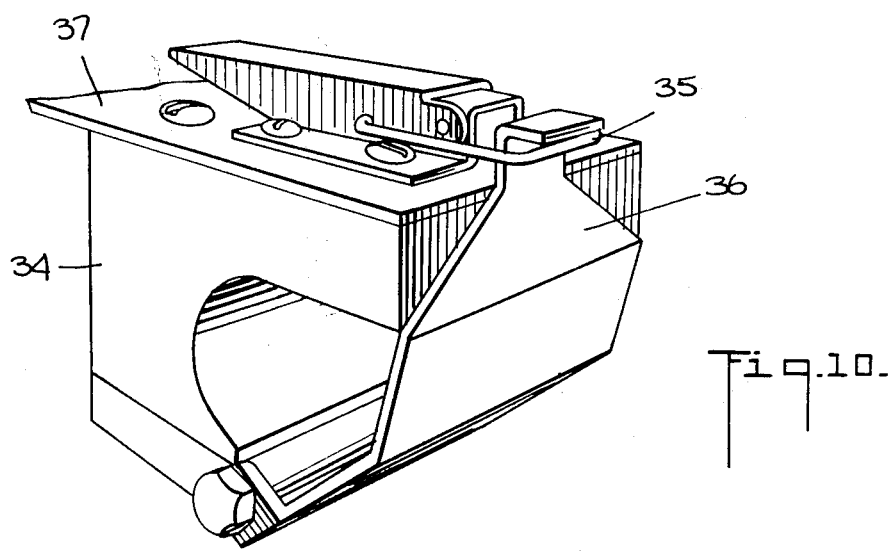
FIG. 10 is a perspective view of the latched clip.

Mounted at spaced positions on bridge 25 are a pair of transverse pieces 28 and 29 having an inverted T formation. In practice, other formations, such as an L or U, may be used. Secured to the opposite ends of piece 28 and lying against the center web thereof are clips 30 and 31. Secured in a like manner to transverse piece 29 are clips 32 and 33. Clips 31 and 33 are identical to the clips of the lifter. Clips 30 and 32, as shown in FIGS. 8, 9 and 10, each consist of a block 34 cut to define a jaw to engage a rung of the ladder which is retained in that position by a latch 35 fastened by a suitable catch 36. The latch 35 is hinged onto a plate 37 secured to block 34.

The transverse space between corresponding clips 30-32 and 31-33 is almost equal to the distance between the rails of the ladder so that the clips fit therebetween, while the longitudinal space between clips 30 and 31 on piece 28 and between 32 and 33 on piece 29 is such as to cause these clips to engage adjacent rungs on the ladder.

The forward latches are restrained in the degree of their maximum opening such that they hang open in a manner enabling them to be easily located over a rung of the ladder. Hence when, as shown in FIG. 7, the adjacent rungs on the ladder are engaged by the clips, the carriage is so coupled to the ladder as to convert it into a wheel-barrow or cart-like structure which may be easily handled by an individual to roll the ladder to the work site.

In practice, in lieu of a set of latched clips, the caddy may be formed with two sets of unlatched clips for light work on fairly smooth surfaces, such as driveways and lawns. However, for rough terrain, should two sets of unlatched clips be used, they may become dislodged from the rungs of the ladder should the caddy wheels hit an obstacle. The latched clips are therefore desirable for heavy-duty use. When using the latched clip design, it is necessary always to orient the set of latched clips on the ladder so that the latches are forward. Otherwise, the clips could become disengaged because of the turning moment involved when the wheels strike an obstacle and rapidly decelerate to zero forward speed.

In some instances, a barrier may be necessary to prevent the load from sliding off the truck. For this purpose a second carriage may be provided, but with a cross-piece interconnecting the legs and without wheels, so that the second carriage may be coupled to adjacent rungs with the legs projecting upwardly from the ladder, thereby converting the ladder to a utility truck. Also, in this case, a lifter with a short pole may be used, the lifter being attachable to the underside of the ladder to provide a retractable rest for the truck.

Inasmuch as the typical homeowner often has occasion to use a ladder but has an infrequent need for a truck to carry heavy loads, with carriages of the type described herein, the homeowner need not purchase and store a truck, since he is now able to convert his ladder to a truck when the need therefor arises.

While there have been shown and described preferred embodiments of a ladder caddy in accordance with the invention, it will be appreciated that many changes and modifications may be made therein without, however, departing from the essential spirit thereof. For example, in lieu of wheels on the caddy, one may install skis when the caddy is intended for use over sand or snow. Alternatively skis may include a retractable harness adapted to attach the skis onto the wheels.

We claim:
1. A caddy for transporting a ladder wheel-barrow style, said ladder having rungs extending between a pair of rails, said ladder comprising:
   A. a wheeled carriage having a raised bridge member which is at right angles to the direction of movement;
   B. a pair of transverse pieces having a channel formation mounted at spaced positions of said bridge, said pieces having a length substantially equal to the space between said rails; and
   C. a pair of clips received within the channels at opposite ends of each piece and secured thereto, said clips extending slightly beyond said ends to provide a forward set of clips and a rear set of clips, the outer faces of said clips being positioned directly adjacent said rails when said clips engage adjacent rungs of the ladder, each clip in at least one set being formed of a resilient plastic block having flat outer faces and being cut to define a pair of spring jaws which are forced apart when applied to a rung of the ladder, the sets being spaced apart to engage adjacent rungs on the ladder, and the distance be- tween corresponding clips on the piece being substantially equal to the distance between the rails on the ladder whereby the outer faces of the clips are positioned directly adjacent said rails, said carriage being formed by a pair of legs whose tops are interconnected by said bridge member.

2. A caddy as set forth in claim 1, further including wheels rotatably mounted on the lower end of said legs.

3. A caddy as set forth in claim 1, wherein the other set of clips is provided with retractable latches to lock said clips to the rung engaged thereby.

* * * * *